Aug. 4, 1964
J. W. STAGE
3,143,368
SAFETY LOCK
Filed May 15, 1963
3 Sheets-Sheet 1
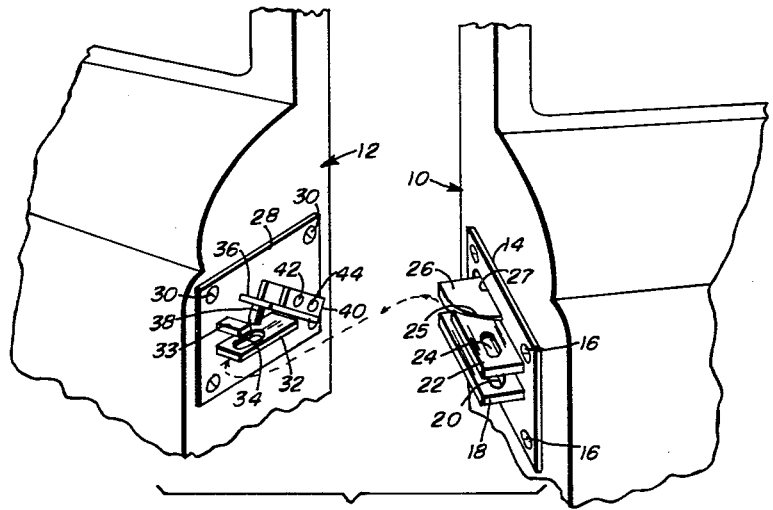
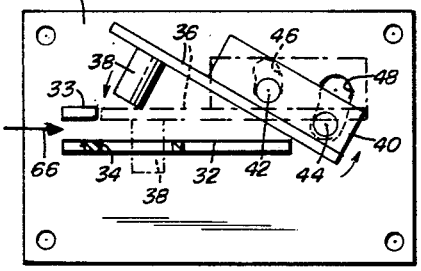
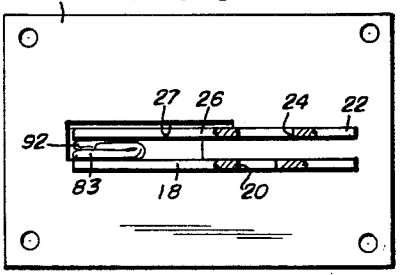
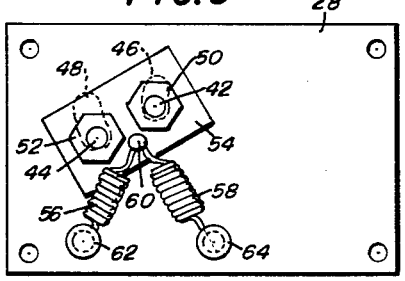
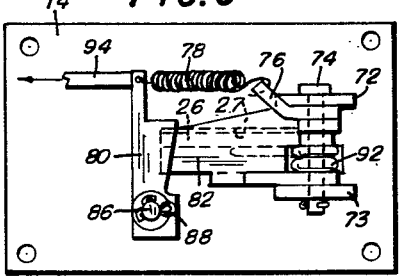
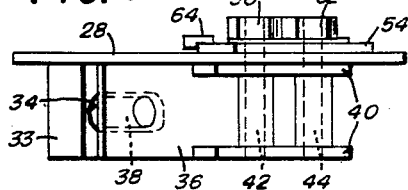
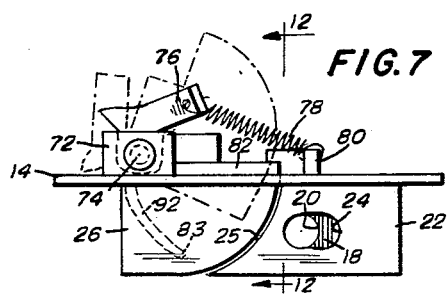

Aug. 4, 1964   J. W. STAGE   3,143,368
SAFETY LOCK
Filed May 15, 1963   3 Sheets-Sheet 2

INVENTOR.
JACK W. STAGE
BY John J. Byrne
ATTORNEY

Aug. 4, 1964 J. W. STAGE 3,143,368
SAFETY LOCK

Filed May 15, 1963 3 Sheets-Sheet 3

INVENTOR
JACK W. STAGE

BY *John J Byrne*
ATTORNEY

United States Patent Office 3,143,368
Patented Aug. 4, 1964

3,143,368
SAFETY LOCK
Jack W. Stage, 562 Blackberry Lane, San Rafael, Calif.
Filed May 15, 1963, Ser. No. 280,525
11 Claims. (Cl. 292—198)

This invention relates to a locking device, and more specifically relates to a locking device having intermeshing parts carried by a pair of members movable with respect to each other.

A principal objective of this invention is to provide an automatic lock which takes advantage of the extremely rugged characteristics of a holding means comprised of two or more intermeshed metal plates secured together by a bolt or lug inserted through aligned apertures in each of the plates. A further objective of the invention is to provide a lock of this type capable of operation by merely moving one of said members with respect to the other.

Another objective of the invention is to provide a lock with very few moving parts, extremely simple in manufacture, and capable of efficient operation in a wide range of sizes.

The subject invention finds many uses in many fields including such environments as vehicle safety belts, automobile door locks, and luggage. It is useful for all apparatus where secure fastening means are essential, and where it is desirable that the lock means are activated when the two disengaged members are brought into engagement.

A further objective of the invention is to provide a locking mechanism which, prior to failing, would require a force sufficient to shear a steel pin.

These and other important objectives and advantages of the invention will be more fully understood upon a reading of the following specifications taken in view of the attached drawings, wherein:

FIGURE 1 is a perspective of an automobile door and its associated post prior to closing the door;

FIGURE 2 is an elevation view of the apparatus mounted to the door post;

FIGURE 3 is a rear view of FIG. 2;

FIGURE 4 is a plan view of FIG. 2;

FIGURE 5 is an elevation view of the apparatus carried by the automobile door shown in FIG. 1;

FIGURE 6 is a rear elevation of FIG. 5;

FIGURE 7 is a plan view of FIG. 5;

Figure 8:
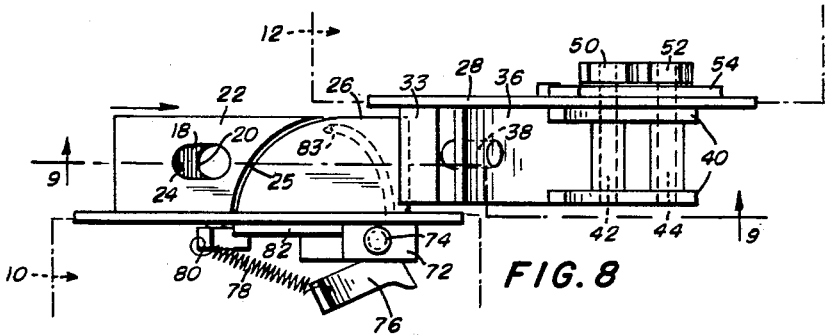
FIGURE 8 is a plan view of the locking apparatus as the door approaches the door post.
Figure 9:
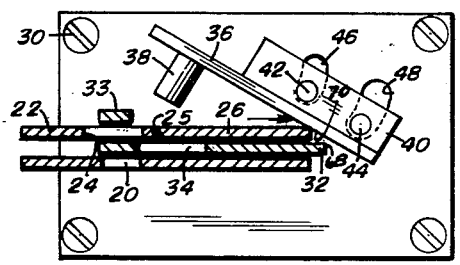
FIGURE 9 is a section along the line 9—9 of FIG. 8 just prior to the door being completely shut.

Although as previously mentioned, the subject invention is capable of many uses, the following description is based on its adaptation to an automobile door and its corresponding door post. The automobile door is indicated by the numeral 10 and the post by the numeral 12. Securely fastened to to door 10 is a mounting bracket 14 secured to the door by way of screws 16. The bracket covers an opening or housing in the door for housing parts hereinafter described.

Extending horizontally outwardly from bracket 14 is a bottom plate 18 having a pin receiving aperture 20 at one end thereof. A middle plate 22, having an aperture 24 in alignment with aperture 20, is rigidly secured to the bracket in spaced parallel relationship with the lower plate 18. At the other end of middle plate 22, and coplanar therewith, is a camming plate 26 which is swingable through an elongated slot 27 of bracket 14 into the previously mentioned housing. Plates 22 and 26 mate along arcuate sides 25 to facilitate this movement.

Mounted on post 12 is a bracket 28 in opposed face-to-face relationship with the bracket 14 when the door is in its closed position. The bracket is securely fastened to the interior of the door post by a plurality of screws 30. Plate 28 also covers a receptacle or housing in the door post which houses apparatus mounted on the inner surface of bracket 28. Extending outwardly from bracket 28 is a guide plate 32 having an aperture 34 formed at one end thereof. The guide plate 32 is similar in dimension to the lower plate 18, and is adapted to intermesh between plates 18 and 22 when the door is closed. A second, much shorter, guide plate 33 is arranged parallel and above the leading edge of plate 32.

Pivotally mounted to bracket 28 is a pivot plate 36 having a downwardly extending retaining pin 38 rigidly secured thereto. The pin may be formed integral with the plate or affixed by way of a strong weld. Extending upwardly from pivot plate 36 is a flange 40 which carries a pair of horizontal pins 42 and 44. The pins extend through a pair of arcuate slots 46 and 48 formed in bracket 28. At their inner ends (interiorly of the door post), pins 42 and 44 are threaded to receive retaining nuts 50 and 52 which together with an apertured control plate 54, maintain the pivoting member in engagement with the outer surface of bracket 28. In accordance with FIG. 3, a pair of tension devices 56 and 58 normally bias the pins to the lower end of slots 46 and 48 such that the pivot plate assumes the angular position disclosed in FIGS. 1 and 2. The tensioning members each have one of their ends connected to a common boss 60 on control plate 54 and their other ends connected to bosses 62 and 64 extending from the surface of bracket 28.

It is to be understood that the dotted line in FIG. 1 indicates that the door 10 is closer to the viewer than the post 12. It is also to be understood that the mechanism disclosed would work equally well if the assembly associated with bracket 14 were mounted to post 12 and the assembly associated with bracket 28 were mounted to door 10. This would be a mere reversing of parts with little change in function.

Prior to discussing the unlatching elements carried in the housing of door 10 it is best to understand the operation of the two assemblies as they engage one another for positively securely the door to the post. The arrow 66 in FIG. 2 indicates the path of movement of the door 10 as it travels from its open position to the closed position. Although in the particular embodiment described this movement is slightly arcuate because of the hinged automobile door, the path can be considered as a straight line for purposes of description. It should also be noted from FIG. 2 that the pivoting plate 36 is angularly interposed in this direction path because of the normal bias in springs 56 and 58.

As door 10 approaches the post 12, the camming plate 26 and middle plate 22 are inserted into the channel defined by guide plates 32 and 33 until the forward surface 68 of the cam plate strikes the lower surface 70 of the pivot plate 36. Concurrently, plate 18 is moving below and parallel to the plate 32. Further movement of cam plate 26 to the right, as viewed in FIG. 10, causes the pivot plate 36 to rotate about pin 42 bringing pin 38 down until it strikes the upper surface of cam plate 26.

A still further movement causes the pin to slide along the upper surfaces of plates 26 and 22 as it approaches aperture 24. Prior to pin 38 engaging the aperture 24, plate 26 travels a sufficient distance to cause plate 36 to rise and pins 42 and 44 to be lifted in their respective slots. During this last-mentioned movement, the pivot point of plate 36 is about the lower end of pin 38 as it slides along the upper surfaces of the plates 26 and 22. When aperture 24 engages pin 38, tilt plate 36 moves down with pin 38 rotating about pin 44 and with pin 42 moving down in slot 46. This engaging motion is secured through tensioning devices 56 and 58. Such pivoting motion causes pin 38 to be inserted in sequence into apertures 24, 34 and 20. The distance between pin 44 and pin 38 is set to insure penetration at the time the apertures are aligned. The pivot plate 36 will remain in this position because of the bias of springs 56 and 58 and the inability of the plate 36 to pivot down due to the interposition of cam plate 26 between plate 18 and the pivoted end of plate 36. The slide slots 46 and 48 also permit plate 36 to assume a true parallel, non-tilting relationship with plate 22.

Figure 10:
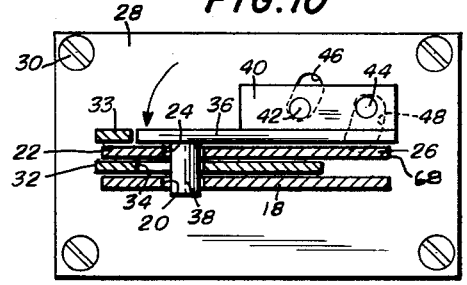
FIGURE 10 is a view similar to FIG. 9 after the door has been shut and locked.
Figure 11:
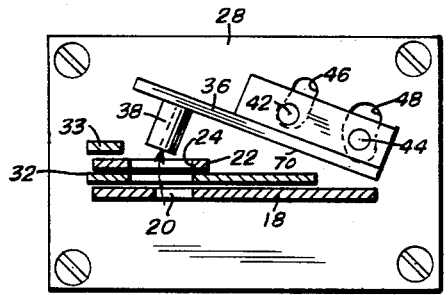
FIGURE 11 is a view similar to FIG. 10 after the camming plate has been removed.

As seen in FIG. 10, the pin 38 extends through three intermeshed plates and the door cannot spring away from the post without shearing the pin 38 or breaking its connection between the plate 22.

Figure 12:
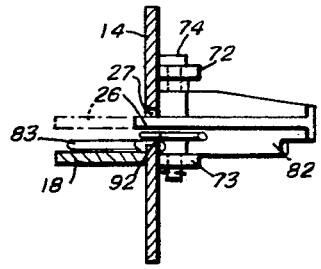
FIGURE 12 is a section along the line 12—12 of FIG. 7.

In order to unlatch the assemblies thus far described, a reference to FIGS. 7, 8, and 12 should be had. Extending inwardly of bracket 14 are a pair of journals 72 and 73 mounting a vertical shaft 74. An appendage 76 of the plate 26 on the opposite side of bracket 14 is rotatably mounted about the shaft and moves with plate 26. A blocking member 82, perpendicular to and integral with plate 26, covers slot 27 when the plate 26 is in its camming position. A tension device 78 connected to the outer end of appendage 76 is connected to the upper end of a latching member 80. The member 80 is pivotally secured about a pin 86 and held to the pin by way of a cotter pin or the like 88.

A coil spring 92 about shaft 74 has an inner end bearing against blocking member 82 and an outer end 83 extending into the channel defined by plates 18 and 26. As guide plate 32 traverses the channel, it depresses spring extension 92 and places a force against blocking member 82. The member 82 is maintained over slot 27 however, by the latch 80. Any convenient mechanical linkage 94 can lead the latch member 80 to a position of access for a person in the car.

In operation the door is unlocked by moving latch 80 to the left (FIG. 6) against the bias of spring 78. This permits the blocking member and plate 26 to move to the dotted line, open position of FIGURE 7. As viewed in FIGURE 6, the plate 82 pivots toward the viewer. Since blocking plate 26 is no longer interposed between plates 36 and 34, the plate 36 again moves about pins 42 and 44 causing pin 38 to be withdrawn from the respective plate apertures. The door can then be opened with ease.

Figure 13:
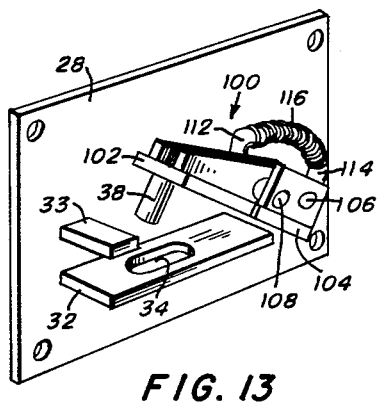
FIGURE 13 is a perspective of the assembly carried by the door post in a different form.
Figure 14:
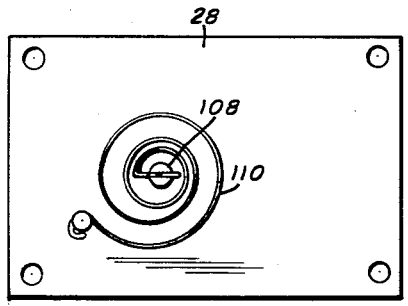
FIGURE 14 is a diagrammatic section similar to FIG. 9 showing the form of FIG. 13.
Figure 15:
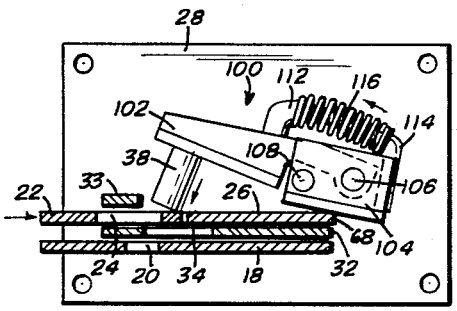
FIGURE 15 is a view of the FIG. 14 elements after the door has been shut and locked.

A further embodiment of the invention is shown in FIGS. 13 through 16. In this embodiment, the assembly mounted to plate 14 remains the same as do plates 32 and 33 of the assembly mounted on plate 28. However, the pivot plate means 36 is replaced with a split plate assembly 100. The assembly 100 is comprised basically of a leading plate 102 and a trailing plate 104 which are pivotally connected together about a pin 106. The entire assembly is pivotally mounted to plate 28 by way of a pin 108. The assembly is normally in the angularly disposed position, as seen in FIGS. 13 and 15, under the bias of spring 110. A pin 112, extending upwardly from plate 102, and a pin 114, extending upwardly of plate 104, are bridged by a compression spring 116 which holds the two plates in a coplanar relationship.

Figure 16:
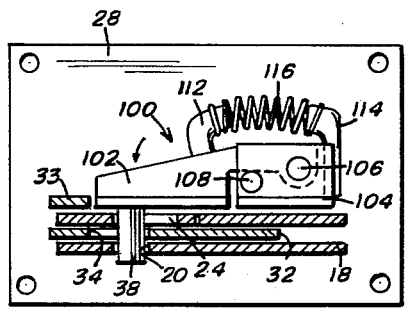
FIGURE 16 is a rear elevation of FIG. 13.

The operation of this embodiment can best be seen with reference to FIGS. 15 and 16. As the cam surface 68 strikes the bottom of plate 104, the plate 104 pivots upwardly to an approximate horizontal position charging spring 116. As the pin receiving apertures are aligned, the pin 38 will penetrate the aligned apertures under the action of spring 116 and the door will be locked as previously described. It should be noted that the pin 38 again slides along the upper surface of plates 26 and 22 prior to being received by the apertures.

In order to unlock the assembly, plate 26 is again pivoted inwardly from between plates 104 and 32 causing assembly 100 to again assume the position shown in FIG. 13 under the bias of spring 110. This, of course, causes the pin to be withdrawn from the apertures and the door may be readily opened.

In a general manner, while there has been disclosed an effective and efficient embodiment of the invention, it should be well understood that the invention is not limited to such an embodiment, as there might be changes made in the arrangement, disposition, and form of the parts without departing from the principle of the present invention as comprehended within the scope of the accompanying claims.

I claim:

1. A locking device for securing first and second items together which have relative movement between disengaged and engaged positions comprising a first plate extending outwardly from said first item and having an aperture near one end thereof, a second plate, a pin extending from said second plate, means pivotally mounting said second plate to said first item for movement between an open position where said pin is spaced from said aperture to a closed position where said pin extends through said aperture, a third plate carried by said second item, a cam surface on said third plate engageable with said second plate for moving said second plate from said open position to said closed position and said pin through said aperture as said items are moved from said disengaged position to said engaged position, second means removing said cam member from engagement with said second plate and pivoting said second plate to said open position, and third means of said second item for receiving said pin when said pin is in said engaged position.

2. A locking device for securing first and second items together which have relative movement between disengaged and engaged positions comprising a first plate extending outwardly from said first item and having an aperture near one end thereof, a second plate, a pin extending from said second plate, means pivotally mounting said second plate to said first item for movement between an open position, where said pin is spaced from said aperture and the planes of said first and second plates intersect, to a closed position where said pin extends through said aperture and said planes are parallel, a third plate in a plane parallel to said first plate carried by said second item and having a second aperture therein, a cam means forming a portion of said third plate engageable with said second plate for moving said second plate from said open position to said closed position and said pin through said first and second apertures as said items are moved from said disengaged position to said engaged position, and second means removing said cam member from engagement with said second plate and pivoting said second plate to said open position.

3. A locking device for securing first and second items together which have relative movement between disengaged and engaged positions comprising a first plate extending outwardly from said first item and having an aperture near one end thereof, a second plate, a pin extending from said second plate, means pivotally mounting said second plate to said first item for movement between an open position where said pin is spaced from said aperture to a closed position where said pin extends through said aperture, a tension element biasing said second plate to said open position, a third plate carried by said second item and having a second aperture therein, a cam member coplanar with said third plate engageable with said second plate and moving said second plate from said open position to said closed position and said pin through said first and second apertures as said items are moved from said disengaged position to said engaged position, a shaft perpendicular to the plane of said first plate and an extension of said second plate journalled about said shaft, such that said cam member is swingable away from said second plate about said shaft.

4. A locking device for securing first and second planar brackets together which have relative movement between a disengaged position and an engaged position wherein said brackets are in face to face relationship, comprising a first plate extending perpendicularly outwardly from said first bracket and having an aperture near one end thereof, a second plate, a pin extending from said second plate, means pivotally mounting said second plate to said first bracket about an axis normal to said first bracket for movement between an open position where said pin is spaced from said aperture to a closed position where said pin extends through said aperture, a third plate carried by said second bracket, a cam surface on said third plate engageable with said second plate for moving said second plate from said open position to said closed position and said pin through said aperture as said brackets are moved from said disengaged position to said engaged position, means removing said cam member from engagement with said second plate and thereafter pivoting said second plate to said open position, and third means of said second bracket for receiving said pin when said pin is in said engaged position.

5. A locking device for securing first and second planar brackets together which have relative movement between a disengaged position and an engaged position wherein said brackets are in face to face relationship, comprising a first plate extending outwardly from said first bracket and having an aperture near one end thereof, a second plate, a pin extending from said second plate, means pivotally mounting said second plate to said first bracket for movement between an open position, where said pin is spaced from said aperture and the planes of said first and second plates intersect along a line, to a closed position where said pin extends through said aperture and said planes are parallel, a third plate in a plane parallel to said first plate carried by said second bracket along a path intersecting the plane of said second plate in its first position, said third plate having a second aperture therein, a cam means forming a portion of said third plate engageable with said second plate for moving said second plate from said open position to said closed position and said pin through said first and second apertures as said items are moved from said disengaged position to said engaged position, and second means removing said cam member from engagement with said second plate and pivoting said second plate to said open position.

6. A locking device for securing first and second planar brackets together which have relative movement between a disengaged position and an engaged position wherein said brackets are in face to face relationship, comprising a first plate extending outwardly from said first bracket and having an aperture near one end thereof, a second plate, a pin extending from said second plate, means pivotally mounting said second plate to said first bracket about an axis normal to said first bracket for movement between an open position, where said pin is spaced from said aperture and the planes of said first and second plates intersect along a line, to a closed position where said pin extends through said aperture and said planes are parallel, a third plate in a plane parallel to said first plate carried by said second bracket along a path intersecting the plane of said second plate in its first position, said third plate having a second aperture therein, a cam means forming a portion of said third plate engageable with said second plate for moving said second plate from said open position to said closed position and said pin through said first and second apertures as said items are moved from said disengaged position to said engaged position, second means normally holding said cam member to a position below said second plate, and third means biasing said cam member away from said last mentioned position.

7. A locking device for securing first and second planar brackets together which have relative movement between a disengaged and an engaged position comprising a first plate extending outwardly from said first bracket and having an aperture near one end thereof, a second plate, a pin extending from said second plate, means pivotally mounting said second plate with respect to said first bracket for movement between an open position where said pin is spaced from said aperture to a closed position where said pin extends through said aperture, a third plate carried by said second bracket, a fourth plate carried by said second bracket in spaced parallel relationship with said third plate and having a second aperture at one end thereof, said second bracket having a path of movement such that said first plate intermeshes between said third and fourth plates, a cam surface on said third plate engageable with said second plate for moving said second plate from said open position to said closed position and said pin through all of said apertures as said items are moved from said disengaged position to said engaged position.

8. A locking device for securing first and second brackets together which are in parallel face to face relationship when secured, comprising a first plate extending outwardly from said first bracket and having a first aperture near one end thereof, a second plate, a pin extending from said second plate, means pivotally mounting said second plate with respect to said first bracket for movement between an open position where said pin is spaced from said first aperture to a closed position where said pin extends through said aperture, a third plate carried by said second bracket, a cam surface on said third plate engageable with said second plate for moving said second plate from said open position to said closed position and said pin through said first aperture as said items are moved from said disengaged position to said engaged position, said second bracket having an elongated slot formed therein, second means pivotally mounting said cam member for movement through said slot about an axis parallel to said first bracket, and third means of said second bracket for receiving said pin when said pin is in said engaged position.

9. A locking device for securing first and second planar brackets together which have relative movement between disengaged and engaged positions comprising a first plate extending outwardly from said first bracket and having an aperture near one end thereof, a second plate mounted adjacent said first bracket, a pin extending from said second plate, means pivotally mounting said second plate for movement between an open position where said pin is spaced from said first aperture to a closed position where said pin extends through said aperture, said means comprising a pair of spaced pins respectively extending from said second plate through a pair of elongated slots formed in said first bracket, a third plate carried by said second bracket, a cam surface on said third plate engageable with said second plate for moving said second plate from said open position to said closed position and said pin through said aperture as said brackets are moved from said disengaged position to said engaged position, second means removing said cam member from engagement with said second plate and pivoting said second plate to said open position, and third means of said second bracket for receiving said pin when said pin is in said engaged position.

10. A locking device for securing first and second planar brackets together which have relative movement between disengaged and engaged positions comprising a first plate extending outwardly from said first bracket and having an aperture near one end thereof, second and third plates, means pivotally mounting said second and third plates together and normally biasing them to a coplanar relationship, second means normally biasing said plates angularly with respect to said first plate, a pin extending from said second plate, third means pivotally mounting said second and third plates to said first bracket for movement between an open position where said pin is spaced from said aperture to a closed position where said pin extends through said aperture, a fourth plate carried by said second bracket and having a second aperture therein, a cam member coplanar with said fourth plate engageable with said third plate and moving said third plate angularly with respect to said second plate until said pin moves through said first and second apertures as said brackets are moved from said disengaged position to said engaged position, a shaft perpendicular to the plane of said first plate and an extension of said second plate journalled about said shaft, such that said cam member is swingable away from said second plate about said shaft.

11. A locking device for securing first and second items together which have relative movement between disengaged and engaged positions comprising a first plate extending outwardly from said first item and having an aperture near one end thereof, a second plate, a pin extending from a first end of said second plate, means mounting the other end of said second plate with respect to said first item for movement between an open position where said pin is spaced from said aperture to a closed position where said pin extends through said aperture, a biasing element normally maintaining said second plate to said open position, a third plate carried by said second item, a cam surface on said third plate engageable with said second plate as said first item is moved toward said second item, a first portion of movement causing said pin to engage said third plate and said second plate to pivot about the point of engagement as said point approaches said aperture and a further movement causing said second plate to move from said open position to said closed position and said pin through said aperture as said items are moved from said disengaged position to said engaged position, and second means removing said cam member from engagement with said second plate and pivoting said second plate to said open position about said other end.

References Cited in the file of this patent
UNITED STATES PATENTS 408,308    Keller _____ Aug. 6, 1889

FOREIGN PATENTS 705,578    France _____ Mar. 10, 1931
1,216,068   France _____ Nov. 23, 1959